(12) United States Patent
Park

(10) Patent No.: US 11,154,911 B2
(45) Date of Patent: Oct. 26, 2021

(54) DRILL DEVICE FOR REMOVING PLUGGING IN PIPES

(71) Applicant: LG CHEM, LTD., Seoul (KR)

(72) Inventor: Jong Hyuk Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/340,616

(22) PCT Filed: Dec. 21, 2017

(86) PCT No.: PCT/KR2017/015240
§ 371 (c)(1),
(2) Date: Apr. 9, 2019

(87) PCT Pub. No.: WO2018/230793
PCT Pub. Date: Dec. 20, 2018

(65) Prior Publication Data
US 2020/0047219 A1     Feb. 13, 2020

(30) Foreign Application Priority Data

Jun. 13, 2017  (KR) .................. 10-2017-0073654

(51) Int. Cl.
*B08B 9/045*     (2006.01)
*E03C 1/302*     (2006.01)
(Continued)

(52) U.S. Cl.
CPC .............. *B08B 1/04* (2013.01); *B08B 9/045* (2013.01); *B23B 2215/72* (2013.01);
(Continued)

(58) Field of Classification Search
CPC . B08B 1/04; B08B 9/045; F16L 55/00; E03C 1/302; E03F 9/005; B23B 2215/72; B23B 2270/54
See application file for complete search history.

(56) References Cited

U.S. PATENT DOCUMENTS

| 2,786,218 A | * | 3/1957 | Yousem | ................. E03C 1/302 |
|---|---|---|---|---|
|  |  |  |  | 15/104.33 |
| 4,461,051 A |  | 7/1984 | Schindel |  |

(Continued)

FOREIGN PATENT DOCUMENTS

| CN | 103721985 A | 4/2014 |
|---|---|---|
| CN | 204782737 U | 11/2015 |

(Continued)

OTHER PUBLICATIONS

KR10-0620678B1 machine translation (Year: 2006).*
Search Report issued by the European Patent Office in Appl'n. No. 17913292.3, dated Nov. 13, 2019.

*Primary Examiner* — Douglas Lee
(74) *Attorney, Agent, or Firm* — Dentons US LLP

(57) ABSTRACT

A drill device for removing plugging in pipes, the drill device including: a drill bit for breaking plugging in pipes; a vertical control handle capable of controlling a vertical movement of the drill bit; a drill handle capable of controlling a rotational movement of the drill bit; a screw disposed coaxially with the drill bit; a drill shaft having a first portion surrounding the screw and a second portion to which the drill bit is fixed; and a guide shaft surrounding the first portion of the drill shaft. The vertical control handle and the drill handle are disposed on an extension line of the axis of the screw; the screw is vertically moved by rotations of the vertical control handle; and the guide shaft is rotated by rotations of the drill handle, and in conjunction therewith, the drill bit can be rotated.

5 Claims, 6 Drawing Sheets

(51) Int. Cl.
   *F16L 55/00*      (2006.01)
   *B08B 1/04*       (2006.01)
(52) U.S. Cl.
   CPC ........... *B23B 2270/54* (2013.01); *E03C 1/302*
                         (2013.01); *F16L 55/00* (2013.01)

(56) References Cited

U.S. PATENT DOCUMENTS

| | | |
|---|---|---|
| 9,321,088 B2 | 4/2016 | Doty |
| 9,366,103 B1 * | 6/2016 | Hickie ................. E21B 33/068 |
| 2013/0175097 A1 | 7/2013 | Wardley et al. |
| 2014/0033456 A1 * | 2/2014 | Doty ....................... B08B 9/045 |
| | | 15/104.095 |
| 2014/0079560 A1 * | 3/2014 | Hodges ................ E21B 43/126 |
| | | 417/15 |

FOREIGN PATENT DOCUMENTS

| | | |
|---|---|---|
| JP | 2002346496 A | 12/2002 |
| JP | 2009220154 A | 10/2009 |
| JP | 4661562 B2 | 3/2011 |
| JP | 4864991 B2 | 2/2012 |
| JP | 5761497 B2 | 8/2015 |
| KR | 100606546 B1 | 8/2006 |
| KR | 100620678 B1 * | 8/2006 |
| KR | 100620678 B1 * | 9/2006 |
| KR | 100620678 B1 | 9/2006 |
| KR | 100639590 B1 | 10/2006 |
| KR | 1020060105395 A | 10/2006 |
| KR | 1020120054263 A | 5/2012 |
| KR | 10-1535458 B1 | 7/2015 |

\* cited by examiner

[FIG. 2a]
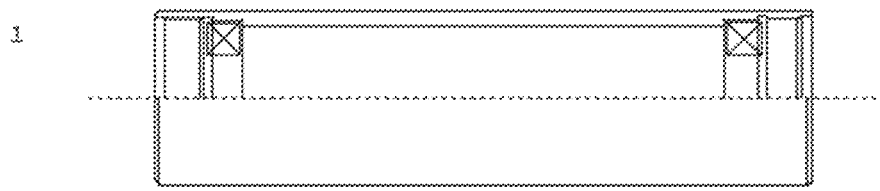
[FIG. 2b]
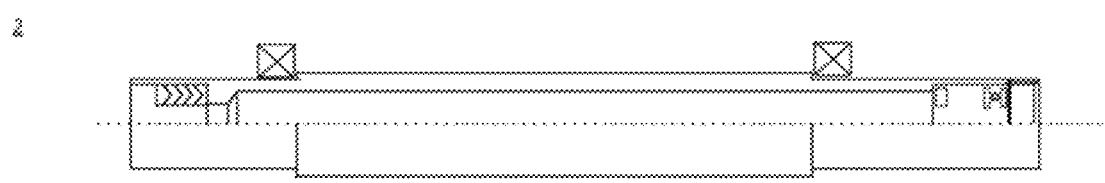
[FIG. 2c]
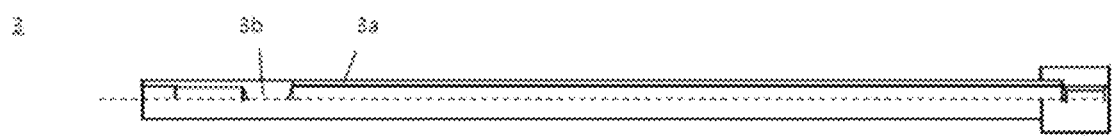
[FIG. 2d]
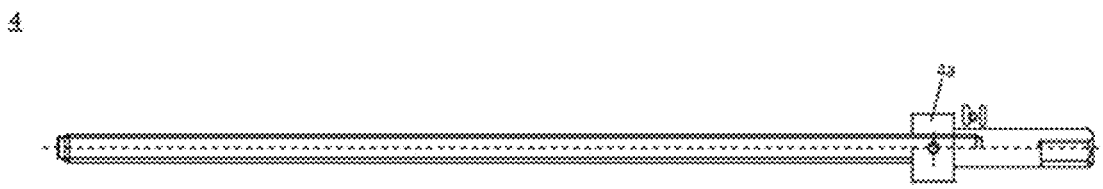

[FIG. 2e]
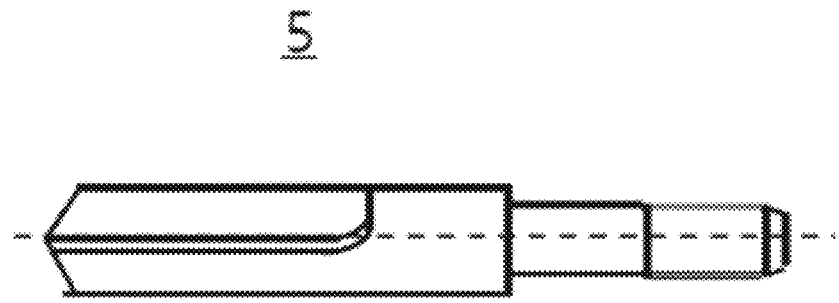
[FIG. 2f]
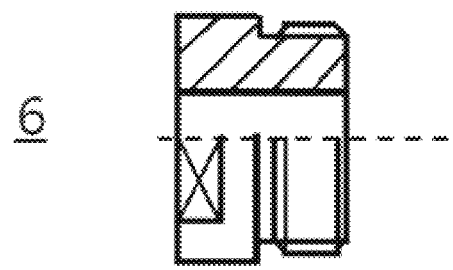
[FIG. 2g]
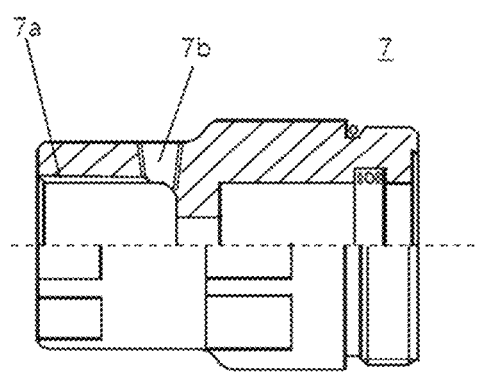

[FIG. 2h]
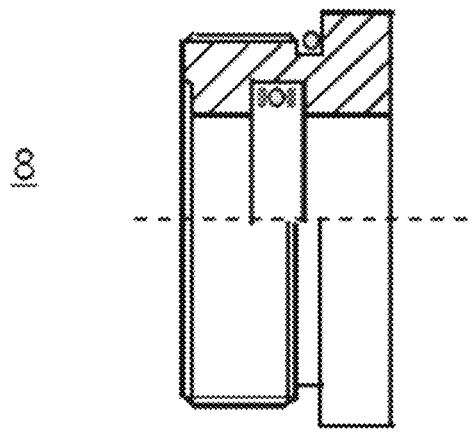
[FIG. 2i]
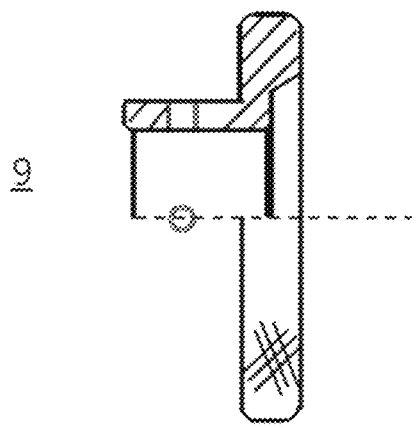
[FIG. 2j]
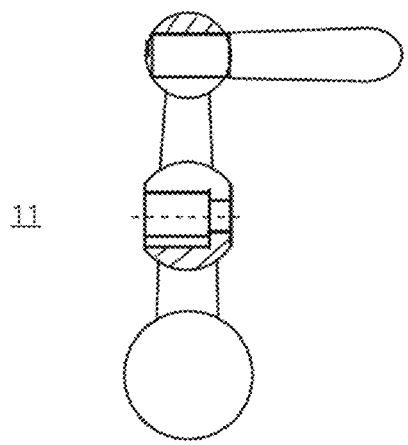

【FIG. 3a】
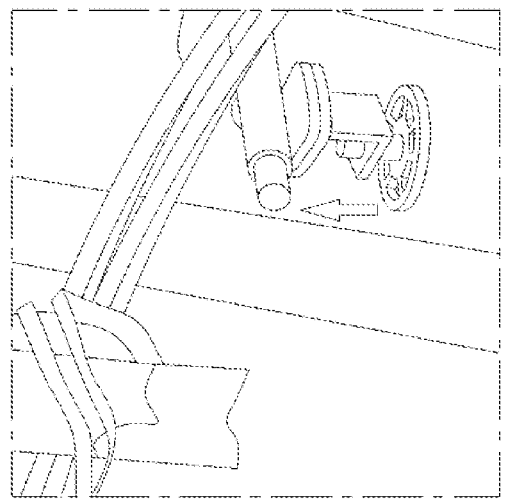
【FIG. 3b】
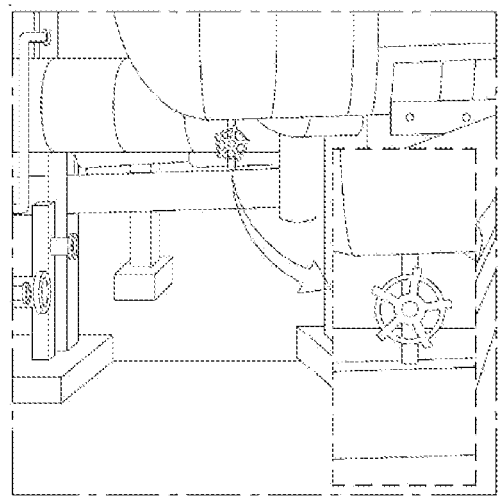
【FIG. 4a】
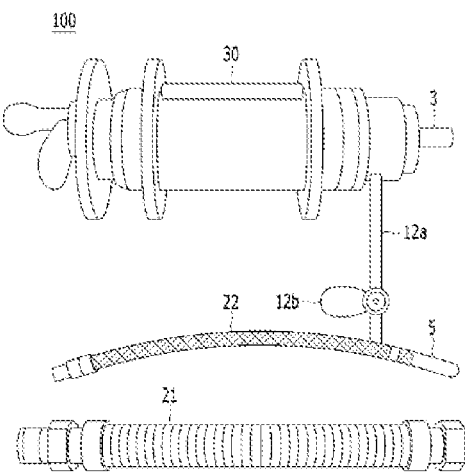

【FIG. 4b】
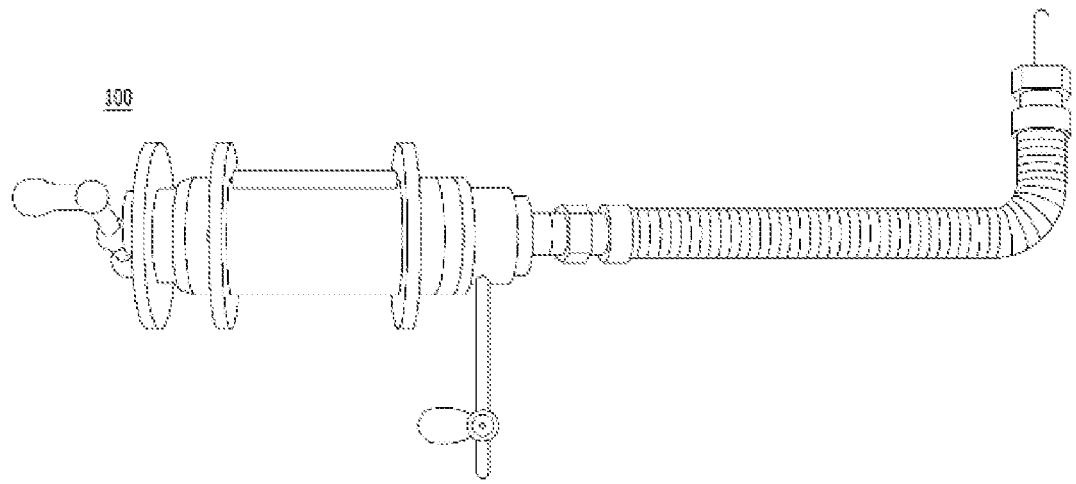
【FIG. 4c】
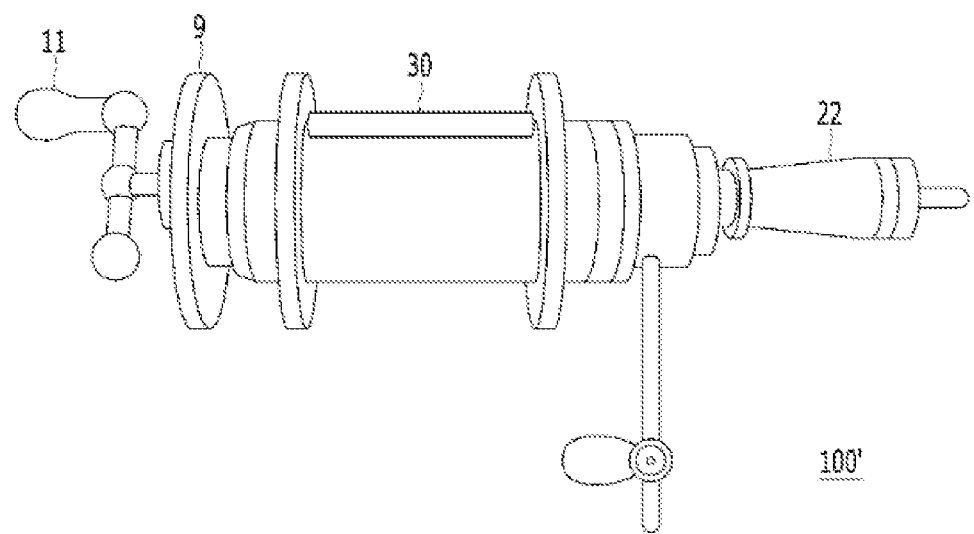

DRILL DEVICE FOR REMOVING PLUGGING IN PIPES

CROSS-REFERENCE TO RELATED APPLICATIONS

This application is a National Stage Application of International Application No. PCT/KR2017/015240, filed on Dec. 21, 2017, which claims the benefit of priority to Korean Patent Application No. 10-2017-0073654, filed on Jun. 13, 2017, the entire disclosure of which is incorporated herein by reference.

TECHNICAL FIELD

The present invention relates to a drill device for removing plugging deposited in a pipe, more particularly a drill device for safely removing plugging in a pipe where a combustible gas or liquid is remained.

BACKGROUND ART

Plugging deposited in a drain pipe has been conventionally removed by applying impact thereto using tools such as a welding rod.

DISCLOSURE

Technical Problem

However, such conventional scheme of removal of plugging by impact with the welding rod may generate sparks in a gas or liquid remained in the drain pipe, causing a fire.

Particularly, when plugging deposited in the drain pipe is removed in the state that a combustible gas or liquid is remained in the pipe, there is problem of fire or explosion. The present invention is designed to solve the problem of the related art, and thus, it is an aspect of the present invention to provide a device for removing plugging in a pipe safely to prevent accidents such as fire and explosion.

Technical Solution

In order to accomplish the above aspect, the present provides a drill device for removing plugging in a pipe, including: a drill bit for crushing the plugging in the pipe; an up-and-down adjustment handle for moving the drill bit in an up and down direction; a drill handle for rotating the drill bit; a screw positioned on a common axis with the drill bit; a drill shaft including a first part surrounding the screw and a second part where the drill bit is fixed; and a guide shaft surrounding the first part of the drill shaft, wherein the up-and-down adjustment handle and the drill handle are on an extended axis of the screw, wherein the up-and-down adjustment handle rotates to move the screw in an up and down direction, and the movement of screw moves the drill bit in a corresponding up and down direction, and wherein the drill handle rotates to rotate the guide shaft and the rotation of the guide shaft rotates the drill bit.

In the drill device for removing plugging in a pipe according to the present invention, the drill bit may be made of bronze.

Also, the drill device for removing plugging in a pipe according to the present invention may further includes a body casing which houses the drill device, and a head cover to collect debris generated during the crushing of plugging by the drill bit, wherein the head cover is coupled to the body casing.

In addition, the drill device for removing plugging in a pipe according to the present invention may further includes a flexible wire for connecting the drill bit and the second part of the drill shaft, and a flexible pressure hose surrounding the flexible wire, which connects the head cover and the pipe, wherein the flexible wire and the flexible pressure hose allow for the easy removal of plugging in a pipe in a narrow space.

In the drill device for removing plugging in a pipe according to the present invention, an outer surface of the screw may have a male thread form and an inner surface of the first part of the drill shaft may have a female thread form, and wherein the up-and-down adjustment handle may rotate to engage the male thread of the outer surface of the screw with the female thread of the inner surface of the first part of the drill shaft to allow the up-and-down movement of the screw.

Also, the drill device for removing plugging in a pipe according to the present invention may further includes a V packing disposed in the head cover and surrounding the second part of the drill shaft and a packing nut compressing the V packing during a movement of the drill bit to enclose a top of the body casing, to prevent the debris collected in the head cover from entering the body casing.

In the drill device for removing plugging in a pipe according to the present invention may further includes a nipple which connects the drill device and the pipe, and wherein the drill bit may be directly connected to the second part of the drill shaft in the absence of the flexible wire.

Advantageous Effects

According to the present invention, the removal of plugging in a drain pipe can be safely conducted even in the state that a combustible gas or liquid is remained in the pipe, thereby preventing accidents such as fire and explosion.

DESCRIPTION OF DRAWINGS

FIGS. 2a to 2j show cross-sectional views of the components included in the drill device of FIG. 1.

FIGS. 3a and 3b are photographs showing the environments of an exemplary processing equipment in which the drill device of the present invention is applied.

FIGS. 4a and 4b are photographs of the drill device according to one embodiment of the present invention, and FIG. 4c is a photograph of the drill device according to the other embodiment of the present invention.

BEST MODE

Figure 1:
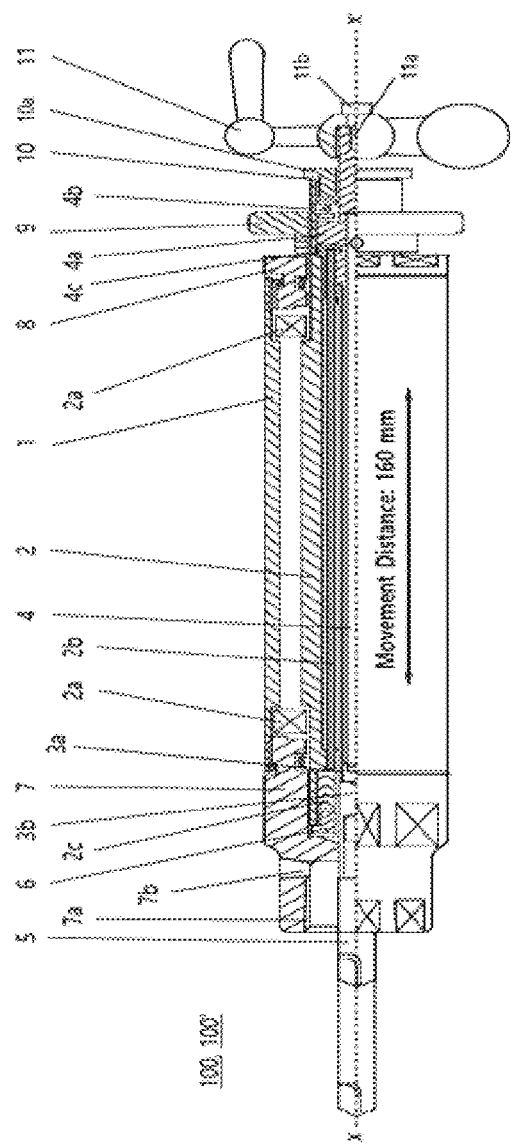
FIG. 1 shows cross-sections of the drill device of the present invention.

Hereinafter, the drill device according to one embodiment of the present invention will be described in detail with reference to the accompanying drawings which illustrate a preferable example of the present invention for the purpose of better explanation, not intended to limit the technical scope of the invention.

Also, the same reference numerals, unless otherwise stated, are used to denote the same or equivalent elements, components or parts illustrated in the drawings, and the repeated explanation thereof will be omitted. In addition, the size and shape of each element, component or part in the drawing may be shown in an enlarged or reduced scale for the sake of convenience.

The drill device for removing plugging in a pipe according to the present invention comprises a drill bit for crushing the plugging in the pipe; an up-and-down adjustment handle being capable of adjusting the movement of the drill bit up and down; a drill handle being capable of adjusting the rotational movement of the drill bit; a screw being positioned on the same axis as the drill bit; a drill shaft including a first part surrounding the screw and a second part where the drill bit is fixed; and a guide shaft surrounding the first part of the drill shaft, wherein the up-and-down adjustment handle and the drill handle are on an extended axis of the screw, wherein the rotation of the up-and-down adjustment handle results in the screw to move up and down, and thereby results in the drill bit to move up and down, and the rotation of the drill handle rotates results in the guide shaft to rotate, and thereby results in the drill bit to rotate.

In the drill device for removing plugging in a pipe according to the present invention, the drill bit may be made of bronze.

Also, the drill device for removing plugging in a pipe according to the present invention may be provided in a body casing, and may further comprise a head cover being capable of collecting plugging which falls down during the removal of plugging by the drill bit, wherein the head cover being capable of coupling to the body casing.

In addition, the drill device for removing plugging in a pipe according to the present invention may further comprise a flexible wire being capable of connecting the drill bit and the second part of the drill shaft, and a flexible pressure hose surrounding the flexible wire and being capable of connecting the head cover and the pipe. The flexible wire and the flexible pressure hose allow for the easy removal of plugging in a pipe even in a narrow space.

In the drill device for removing plugging in a pipe according to the present invention, an outer surface of the screw may have a male thread form and an inner surface of the first part of the drill shaft may have a female thread form, and according to the rotation of the up-and-down adjustment handle, the outer surface of the screw as a male thread in the inner surface of the first part of the drill shaft as a female thread are engaged with each other, thereby resulting in the screw to move up and down.

Also, the drill device for removing plugging in a pipe according to the present invention may further comprise a V packing being disposed in the head cover and surrounding the second part of the drill shaft and a packing nut, and the packing nut compresses the V packing during the movement of the drill bit, causing the top of the body casing to be enclosed, and thereby, preventing the plugging collected in the head cover from entering into the inside of the body casing.

In the drill device for removing plugging in a pipe according to the present invention may further comprise a nipple which connects the drill device and the pipe, and wherein the drill bit may be directly connected to the second part of the drill shaft without the flexible wire.

FIG. 1 shows the outer and inner cross-sections of the drill device 100, 100' of the present invention. On the basis of the dotted line from x to x' crossing the center of the drill device 100, 100', the upper view shows the inner cross-section of drill device 100, 100', and the lower view shows the outer cross-section thereof.

Referring to the inner cross-section of drill device 100, 100', the casing 1 of the drill device 100, 100' has a main shaft 2 provided therein, and has at least two ball bearings 2a between the main shaft 2 and the casing 1. The main shaft 2 has a guide shaft 2b provided therein. Also, the guide shaft 2b has a first part 3a of a drill shaft provided therein, and the lower end of the first part 3a of the drill shaft is coupled to the main shaft 2 (see the right side of FIG. 1). The first part 3a of the drill shaft has a screw 4 provided therein. The drill shaft includes the first part 3a being described above and a second part 3b for fixing a drill bit 5, which will be described below, and these parts are also detachable.

Meanwhile, the lower end of the screw 4 is coupled to a screw shaft 4a (see the right side of the FIG. 1). The lower end of the screw shaft 4a is coupled to an up-and-down adjustment handle 11. The up-and-down adjustment handle 11 has an L-type bolt 11a and a key 11b in the center thereof, thereby engaging the screw shaft 4a in the up-and-down adjustment handle 11. For example, a worker can couple the drill device 100, 100 to the lower portion of a drain pipe to conduct plugging removal tasks. In this case, the worker operates the up-and-down adjustment handle 11 to adjust a drill bit upwardly and downwardly. More specifically, when the worker operates the up-and-down adjustment handle 11, the power of the up-and-down adjustment handle 11 is delivered through the L-type bolt 11a and the key 11b into the screw shaft 4a coupled to the handle 11 and the screw 4 coupled to the screw shaft 4a. The outer surface of the screw 4 has a male thread form and the inner surface of the first part 3a of the drill shaft has a female thread form corresponding to the male thread form, thereby resulting in engagement of the outer surface of the screw 4 and the inner surface of the first part 3a of the drill shaft. Accordingly, the rotation of the up-and-down adjustment handle 11 results in the simultaneous rotation of the screw shaft 4a and the screw 4, and when the outer surface having a male thread form of the screw 4 moves along the inner surface having a female thread form of the first part 3a of the drill shaft, the screw 4 can move up and down. The screw 4 moves forward, thereby pushing up the second part 3b of the drill shaft and a drill bit 5. Thereby, the drill bit 5 can be moved to the point of the drain pipe that plugging is deposited. When the length of the drill device 100, 100', i.e., the length from a head cover 7 to the up-and-down adjustment handle 11, ranges from 400 to 450 mm, the up-and-down movement distance of the screw 4 may range, for instance, from 160 to 200 mm, preferably 160 mm, but the present invention is not limited thereto. The movement distance of the screw 4 may be varied depending on the environment of processing line implemented by the present invention, change or modification of size and shape of the drill device 100, 100', and the like.

As shown in FIG. 1, the first part 3a of the drill shaft surrounds the screw 4, and the drill bit 5 is inserted and fixed in the second part 3b of the drill shaft. Since the second part 3b of the drill shaft has small grooves and the drill bit 5 has protrusions, the grooves of the second part 3b of the drill shaft are coupled with the protrusions of the drill bit 5, thereby fixing the drill bit 5 in the second part 3b of the drill shaft however, the present invention is not limited thereto, and various changes or modification can be made. Thus, the drill handle 9 operates to rotate the drill shaft 3 together with drill bit 5, which allows the safe task of the worker without release of the drill bit 5 from the drill device 100, 100'.

When the drill bit 5 reaches the desired point by the operation of the up-and-down adjustment handle 11, the worker may operate the drill handle 9 to rotate drill bit 5. The screw shaft 4a is provided with a thrust bearing 4b on the rear end thereof and a disc 4c on the front end thereof in the inner side of the drill handle 9. The thrust bearing 4b has bearing fixing nuts 10, 10a on the rear end thereof. More specifically, the rotational force of the drill handle 9 provided by the operation of the drill handle 9 is delivered into the thrust bearing 4b which moves together with the disc 4c being displaced between the screw shaft 4a and the guide shaft 2b, thereby rotating the disc 4b. From this, the guide shaft 2b connected to the disc 4c also rotates together with the disc 4c. As the guide shaft 2b surrounds the drill shaft 3, the rotation of the guide shaft 2b results in the rotation of the drill shaft 3. At this time, the main shaft rotates with the above members. A ball bearing 2a acts to buffer impact by the rotation of the drill bit 5, guide shaft 2b, and main shaft 2, against the body casing 1. The drill handle 9 operates to rotate the guide shaft 2b, and the rotational force of the guide shaft 2b induces the rotation of the drill bit 5 coupled to the second part 3b of the drill shaft. Accordingly, the rotating drill bit 5 is stuck in the plugging and then crushes the plugging.

Meanwhile, the plugging in the drain pipe is exposed in the environment of high temperature and high pressure. Accordingly, when the crushed plugging may be fallen down, it causes harm to the worker. Referring to FIG. 1 again, the drill device 100, 100' has a head cover 7 mounted on the top of the body casing 1, so that the crushed plugging may be collected in the head cover 7 though it is fallen down. The head cover 7 has a V packing 2c and a packing nut 6, which will be described below, therein. Also, the head cover 7 may have a groove 7a being capable of coupling with a nipple 22 shown in FIG. 4a which will be described below or a flexible pressure hose 20 shown in FIG. 4b in the inner surface thereof. In addition, the head cover 7 may have an aperture 7b in a part thereof so that a plugging-emitting duct 12a and a valve 12b is connected thereto as shown in FIGS. 4a and 4b, in which the valve 12b may be opened to discharge the plugging through the duct 12a into the outside of the drill device 100, 100' during the working. If necessary, the duct 12a may be connected to an extending tube so as to prevent the plugging from reaching the worker during the removal of the plugging.

Also, the inner surface of the main shaft 2 is provided with a V packing 2c in the upper side thereof, which is between the drill shaft 3 and the main shaft 2 at the position that the guide shaft 2b terminates. The V packing 2c may surround the drill shaft 3 and have the packing nut 6 on the upper end of the V packing 2c (the left direction of FIG. 1). The V packing 2c may, for example, be made of Teflon, and the packing nut 6 may, for example, be made of stainless steel. Therefore, when the drill bit 5 moves, the packing nut 7 deliver load downwardly to compress the V packing 2c having a certain degree of elasticity given from the Teflon material, and thereby the compressed V packing 2c is expanded vertically to the compressed direction. This allows the enclosure of the body casing 1 to prevent the plugging collected in the head cover 7 from being entering into the inside of the body casing 1, even though the drill bit 5 moves.

FIGS. 2a to 2j show the body casing 1, main shaft 2, drill shaft 3, screw 4 and screw shaft 4a, drill bit 5, packing nut 6, head cover 7, lower casing cover 8, drill handle 9, ball bearing-fixing nut 10, and un-and-down adjustment handle 11 of the drill device 100, 100', respectively. Likewise, the upper view shows the inner cross-section of each member, and the lower view shows the outer cross-section thereof, on the basis of the central dotted line.

FIGS. 3a and 3b are photographs showing the environments of an exemplary processing equipment in which the drill device 100, 100' of the present invention is applied. FIG. 3a is a front view of the exemplary processing equipment in which the drill device 100, 100' of the present invention is applied, and the enlarged photograph of the part shows that plugging is often deposited and may be coupled with the drill device 100, 100' of the present invention. FIG. 3b is the photograph looking up at the processing equipment shown in FIG. 3a from below. As shown in FIG. 3b, the part indicated by arrow is normally closed by a stopper.

FIGS. 4a and 4b are photographs of the drill device 100 which includes a flexible pressure hose 20 and a flexible wire 21. The flexible pressure hose 20 may be coupled to the groove 7a of the head cover 7, and an end of the flexible wire 21 may be coupled to the second part 3b of the drill shaft. Also, the other end of the flexible wire 21 may be coupled to the drill bit 5. The flexible wire 21 provided with the drill bit 5 by connection may be surrounded by the flexible pressure hose 20. Also, FIG. 4c is a photograph of the drill device 100' which includes a nipple 22. As described above, the nipple 22 may be coupled in the groove 7a of the head cover 7. In some cases, the flexible press hose 20 may be replaced with the nipple 22, according to the processing environments implemented by the drill device 100 of the present invention. That is, the drill device 100 of the present invention may be used by disassembling the flexible pressure hose 20 coupled to the head cover 7 and the flexible wire 21 therefrom and then directly connecting the drill bit 5 to the second part 3b of the drill shaft and coupling the nipple 22 to the groove 7a of the head cover 7.

Again referring to FIG. 3b, the stopper may be opened when it needs to remove the plugging generated in the processing equipment. On opening the stopper, there is the part of a female thread form (not shown), to which the drill device 100, 100' may be coupled. Since the flexible pressure hose 20 in the drill device 100 shown in FIG. 4a and the nipple 22 in the drill device 100' shown in FIG. 4c according to the present invention have a male thread form in the end thereof, these may be engaged in the part of the female thread form in the processing equipment of FIG. 3b. Thereby, for example, in the drill device 100' of the present invention shown in FIG. 4c, the drill device 100' may be longitudinally coupled to the lower portion of the processing equipment of FIG. 3b. After the drill device 100, 100' of the present invention is firmly coupled to the processing equipment, the valve shown in FIG. 3b is opened by operation so that the drill bit 5 of the drill device 100, 100' can be entered inside the drain pipe of the processing equipment. As shown in FIG. 1, the up-and-down adjustment handle 11 of the drill device 100, 100' operates to move the drill bit 5 forward, making it reach the plugging, and then the drill handle 9 operates to rotate the drill bit, thereby crushing the plugging.

Again referring FIG. 4a, an end of the drill device 100 may be coupled to the flexible wire 21 to which the drill bit 5 is connected and the flexible pressure hose 20, so the drill device 100 may be coupled to the processing equipment even in a space that is narrow to displace the drill device 100, for example a space that the height of from the lower portion of the processing equipment to the bottom is 200 mm or less. This allows the easy handling of the worker. The pressure hose 20 may resist a pressure of up to the maximum 30 bars and a temperature of up to the maximum 200° C., and it may be made of stainless steel. An end of the flexible wire 21 may be provided with small grooves, and the drill bit 5 is provided with protrusions, from which the drill bit 5 may be fixed to the flexible wire 21. Similarly, the second part 3b of the drill shaft is provided with small grooves and the other end of the flexible wire 21 is provided with protrusions, from which the flexible wire 21 may be fixed to the drill shaft 3. Thereby, the drill handle 9 operates to rotate the drill shaft 3 together with the flexible wire to which the drill bit 5 is connected. This ensures the safe task of the worker without release of the drill bit 5 or the flexible wire 21 from the drill device 100.

Meanwhile, the drill bit 5 may be made of bronze. The bronze material of the drill bit 5 can prevent the generation of sparks even though the removal of plugging is conducted even in the state that a gas or liquid is remained in the drain pipe, thereby significantly reducing the risk of fire or explosion. Although the plugging deposed in the processing equipment is solid, it has a strength less than the drain pipe of stainless steel. Therefore, the rotation of the drill bit 5 can crush the plugging without the damage of the drain pipe.

Again referring to FIGS. 4a and 4c, the outer surface of the drill device 100, 100' is provided with a handle grip 30. Meanwhile, the drill device 100, 100' of the present invention has the up-and-down adjustment handle 11 and the drill handle 9 on the same axis. Accordingly, the worker can hold the handle grip 30 with one hand, while operating the up-and-down adjustment handle 11 or the drill handle 9 with the other hand during the removal of the plugging.

While the present invention has been particularly shown and described with reference to figures and embodiments thereof, it will be understood by those of ordinary skill in the art that the scope of the present invention is not limited thereby and that various changes and modifications may be made therein. Therefore, the actual scope of the present invention will be defined by the appended claims and their equivalents.

EXPLANATION OF REFERENCE NUMERALS 100, 100': Drill device 1: Body Casing
2: Main Shaft 2a: Ball Bearing
2b: Guide Shaft 2c: V packing
3: Drill Shaft 4: Screw
4a: Screw Shaft 4b: Thrust Bearing
5: Drill Bit 6: Packing Nut
7: Head Cover 8: Lower Casing Cover
9: Drill Handle 10: Bearing Fixing Nut
10a: Bearing Fixing Nut 11: Up-and-Down Adjustment Handle
20: Flexible Pressure Hose 21: Flexible Wire
22: Nipple 30: Handle Grip

The invention claimed is:

1. A drill device for removing plugging in a pipe, comprising:
a drill bit for crushing the plugging in the pipe;
an up-and-down adjustment handle for moving the drill bit in an up and down direction;
a drill handle for rotating the drill bit;
a screw positioned on a common axis with the drill bit;
a drill shaft including a first part surrounding the screw and a second part where the drill bit is fixed;
a main shaft comprising a guide shaft, wherein the guide shaft surrounds the first part of the drill shaft;
a body casing which houses the drill device, and a head cover to collect debris generated during the crushing of plugging by the drill bit;
a V packing disposed in the head cover and surrounding the second part of the drill shaft and positioned between the second part of the drill shaft where the guide shaft terminates and the main shaft; and
a packing nut disposed at an upper end of the V packing such that, when the drill bit moves, the packing nut delivers a load in a downward direction to compress the V packing and enclose a top of the body casing,
wherein the head cover is coupled to the body casing,
wherein the up-and-down adjustment handle and the drill handle are on an extended axis of the screw,
wherein the up-and-down adjustment handle rotates to move the screw in an up and down direction, and the movement of screw moves the drill bit in a corresponding up and down direction, and
wherein the drill handle rotates to rotate the guide shaft and the rotation of the guide shaft rotates the drill bit.

2. The drill device for removing plugging in a pipe according to claim 1, wherein the drill bit is made of bronze.

3. The drill device for removing plugging in a pipe according to claim 1, further comprising a flexible wire for connecting the drill bit and the second part of the drill shaft, and a flexible pressure hose surrounding the flexible wire, which connects the head cover and the pipe, wherein the flexible wire and the flexible pressure hose allow for the easy removal of plugging in a pipe in a narrow space.

4. The drill device for removing plugging in a pipe according to claim 1, wherein an outer surface of the screw has a male thread form and an inner surface of the first part of the drill shaft has a female thread form, and wherein the up-and-down adjustment handle rotates to engage the male thread of the outer surface of the screw with the female thread of the inner surface of the first part of the drill shaft to allow the up-and-down movement of the screw.

5. The drill device for removing plugging in a pipe according to claim 1, further comprising a nipple which connects the drill device and the pipe, and wherein the drill bit is directly connected to the second part of the drill shaft.

* * * * *